United States Patent [19]
Nitschke et al.

[11] Patent Number: 5,165,515
[45] Date of Patent: Nov. 24, 1992

[54] SEGMENTED PUSHER CONTROL FOR CONVEYING SYSTEM

[75] Inventors: Michael L. Nitschke, Comstock Park; James T. Shearer, Jr., Ada, both of Mich.

[73] Assignee: Rapistan Demag Corporation, Grand Rapids, Mich.

[21] Appl. No.: 686,741

[22] Filed: Mar. 29, 1991

[51] Int. Cl.⁵ .............................................. B65G 47/46
[52] U.S. Cl. ................................ 198/349.95; 198/370; 198/372
[58] Field of Search ................... 199/349.95, 358, 365, 199/370, 372; 209/653

[56] References Cited

U.S. PATENT DOCUMENTS

| | | |
|---|---|---|
| 2,868,394 | 1/1959 | Greller et al. |
| 2,984,366 | 5/1961 | Greller |
| 3,361,247 | 1/1968 | Lauzon et al. |
| 3,384,237 | 5/1968 | Leonard |
| 3,710,923 | 1/1973 | Fromme et al. ............... 198/81 |
| 3,771,648 | 11/1973 | Revuelta ........................ 209/74 |
| 4,214,663 | 7/1980 | Schopp et al. ................ 209/552 |
| 4,501,365 | 2/1985 | Peyton et al. ................ 209/548 |
| 4,711,341 | 12/1987 | Yu et al. ....................... 198/372 |
| 4,738,347 | 4/1988 | Brouwer et al. .............. 198/372 |
| 4,884,677 | 12/1989 | Yu et al. ....................... 198/370 |
| 5,038,912 | 8/1991 | Cotter ........................... 198/372 |

FOREIGN PATENT DOCUMENTS

2745298 11/1978 Fed. Rep. of Germany.

*Primary Examiner*—Joseph E. Valenza
*Attorney, Agent, or Firm*—Price, Heneveld, Cooper, DeWitt & Litton

[57] ABSTRACT

An article conveying system of the type having a conveying surface defined by the uppermost ones of a plurality of slats interconnected in an endless web for displacing articles laterally with respect to the conveying surface and including a diverter shoe movably mounted to each slat, includes a system of parallel tracks and diverting gates to independently selectively move one or more diverter shoes laterally while maintaining lengthwise alignment of the selected shoes in order to displace an article without rotation of the article. A control senses both the position of articles and the position of shoes in order to determine the relative spacing between shoes and articles. This allows the control to determine whether a shoe assigned to an article interferes with another article to accommodate article spacing of less than one shoe. Articles may be displaced using only one or two shoes by determining that the shoe is properly positioned with respect to the article. A divert control module maintains a dynamic accumulated article length for the accumulation section of a take-off conveyor based on article-length data received from a central sort controller, spur take-off speed and the time from the most recent divert in order to determine whether an article may be diverted to the associated spur.

32 Claims, 11 Drawing Sheets

SEGMENTED PUSHER CONTROL FOR CONVEYING SYSTEM

BACKGROUND OF THE INVENTION

This invention relates generally to conveyor systems, and more particularly to conveyor systems having an endless conveying surface and diverter shoes mounted on the support members making up the conveying surface, for lateral movement with respect to the conveying surface. The invention is especially adapted to divert packages selectively to one or more sortation spurs extending laterally from the conveying surface.

Article diverters using a moving conveying surface consisting of a plurality of parallel support members mounted to endless chains, have been known for a number of years. Such diverters utilize a diverter shoe movably mounted on each support member for lateral movement with respect to the conveying surface under the guidance of a track network. Diverting gates in the track network selectively transfer guidance of each diverter shoe from a track running in the direction of the movement of the conveying surface to a diagonal track in order to cause lateral movement of the diverter shoes In order to avoid wasted spacing between variable-length packages, such diverters may include manual or automatic measuring means at an infeed point to cause the diverter gate associated with the selected sortation spur to divert a selected number of shoes corresponding in general to the length of the package. Exemplary of this type of conveyor are U.S. Pat. No. 3,361,247, issued to James N. Lauzon et al and U.S. Pat. No. 4,738,347, issued to Brouwer, the latter being assigned to the present assignee.

While the use of the measured length of packages to select the number of shoes used to divert each package eliminates some wasted package spacing, the prior art requires that at least one diverter shoe be left unused between packages in order to avoid the diverting of one package from interfering with the diverting of a forward or trailing package Furthermore, the prior art diverters typically switch the selected number of diverter shoes onto a single diagonal track in order to laterally displace the package. Because the diverter shoes are aligned during the diverting motion in a diagonal across the moving conveying surface, the package is rotated with respect to the direction of movement The rotation of the packages increases their length in the direction of conveyor movement, which requires additional spacing between packages.

Another difficulty experienced with prior conveyor sortation systems is that a rapid series of diverts to a single spur may temporarily overload the accumulation section of the take-away conveyor for that particular spur. The powered accumulation section typically operates at a slower speed than the rest of the power-driven take-away conveyor. In order to avoid a jam-up, prior art systems monitor the back-up of packages in the accumulation section on the take-away conveyor associated with each spur and suspend diverts to that spur when a jam-up occurs This is traditionally accomplished by a photodetector, or other position sensor, with a suitable time delay to avoid actuation of the sensor by the momentary passage of a package along the conveyor, so that only an excess accumulation will be detected and only after it occurs. The required time delay creates a situation in which further accumulation may occur without detection, necessitating a conservative design approach, such as extra accumulation space, or by restricting the rate at which packages may be diverted, or both.

SUMMARY OF THE INVENTION

The present invention reduces the required spacing between packages beyond that achieved by prior art systems and, in fact, to less than the length of a single diverter shoe in the direction of movement of the conveying surface. This is accomplished in a conveying system having a longitudinally moving conveying surface defined by the uppermost of a plurality of support members interconnected in spaced relationship with each other in an endless web. A plurality of diverter shoes, each movably mounted on one of the support members for lateral movement with respect to the conveying surface, are laterally propelled by actuation means for imparting a lateral force to move the diverter shoes laterally to displace an article position on the conveying surface. The actuation means, according to one aspect of the invention, includes means for independently selectively moving one or more of the diverter shoes laterally, while maintaining lengthwise alignment of all selected shoes and control means for selecting particular shoes to divert a particular article including means for determining the relative position between shoes and articles. This provides for the lateral displacement of articles of varying length, supported on the conveying surface transversely without rotation of the diverted article. Furthermore, minimum spacing between articles may be accommodated because shoes that overlap more than one article may be identified, and not used, and the coverage of the selected shoes on either side of the centerline of the article may be evaluated to ensure that the assigned shoes are sufficient to displace that article.

The means for independently moving the diverter shoes may include a plurality of spaced apart, generally parallel track members terminating in the vicinity of the spur, a diverter associated with each of the track members, for selectively diverting one of the diverter shoes onto the associated track member and control means for selectively operating each diverter to divert selected ones of the shoes onto the track members. The diverter shoes are thus laterally moved in essentially a straight line with respect to the movement of the conveying system to provide sortation of the packages without their rotation on the conveying surface.

According to another aspect of the invention, track means are provided for guiding the diverter shoes laterally and diverting means are provided to divert diverter shoes to the track means. Control means are provided for selectively operating the diverting means and include a first sensing means for sensing the position of a package on the conveying means, a second sensing means for sensing the position of shoes on the conveying means and determining means responsive to the first and second sensing means for determining the relative spacing between the shoes and the packages in the direction of movement of the conveying surface. With the position of each package with respect to the associated diverting shoes being established, it is possible to determine whether the leading and trailing shoes associated with each package will interfere with the preceding and following packages If so, then the leading and trailing shoes may be selectively not diverted such that the package is diverted with the remaining shoes associated with that package Other beneficial functions may be performed using the information of the relative position between packages and shoes. For example, it can be determined whether the associated shoes span the centerline of the package by a sufficient proportion of the package in order to allow the sortation of packages with two, and even one, diverting shoe. Packages having a length substantially no greater than the length of a diverting shoe in the direction of movement of the conveying surface may thus be sorted.

According to yet another aspect of the invention, in a sortation system having a powered take-off conveyor included with each of the sortation spurs, control means for selectively operating the diverting means includes means for determining the length of packages and means for selectively operating the diverting means for the designated spur to divert packages onto that spur. The control means determines the total accumulated length of packages which will occur on the accumulation section of its take-away conveyor, when a given package reaches the accumulation section, from data including the length of the packages to be diverted. By factoring in the speed of the powered accumulation conveyor, the control means can dynamically determine the amount of accumulated package length which will occur in order to avoid diverting packages onto what will become a full take-away conveyor.

These and other objects, advantages and features of this invention will become apparent upon review of the following specification in conjunction with the drawings.

DESCRIPTION OF THE PREFERRED EMBODIMENT

Figure 1:
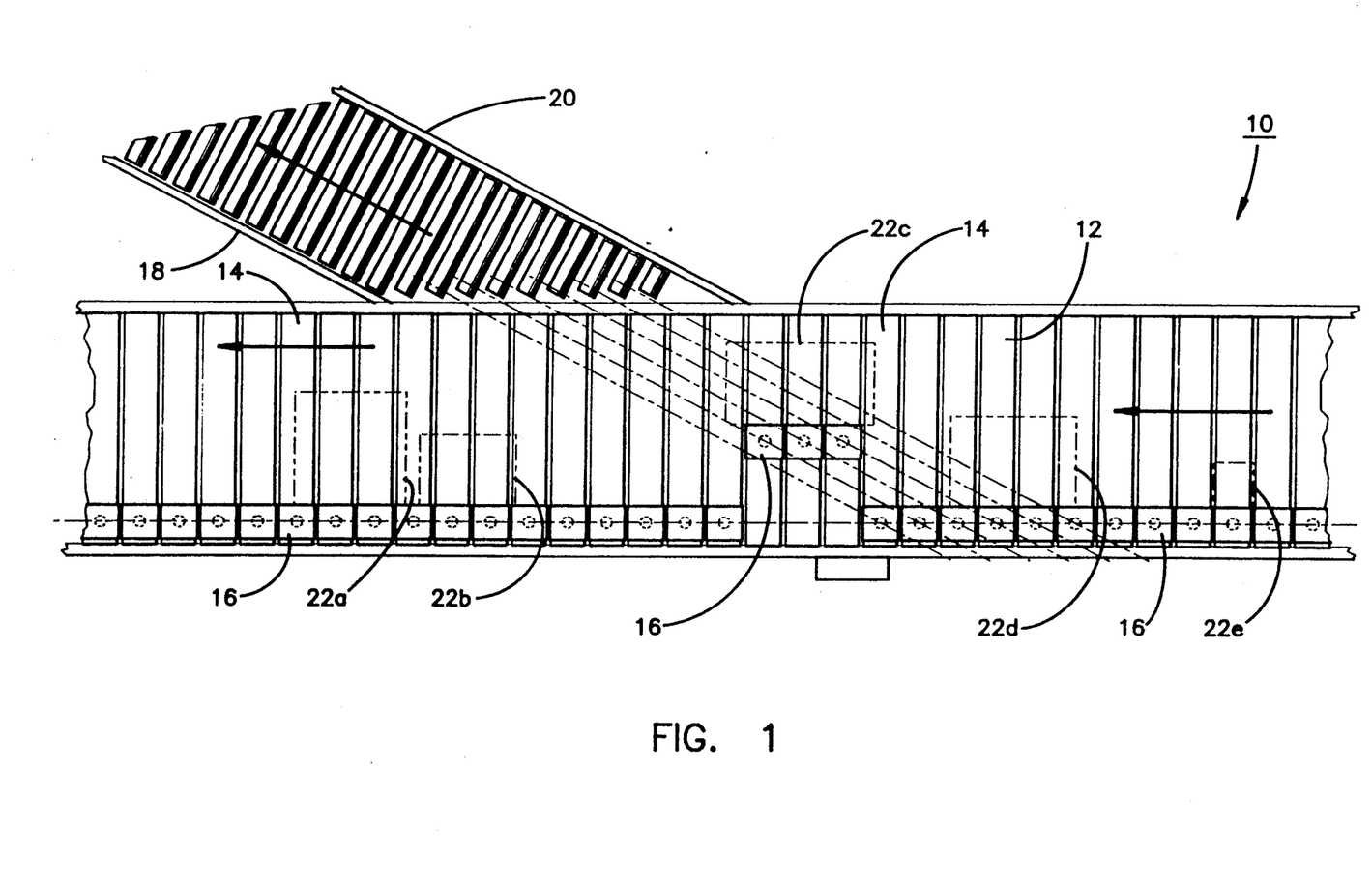
FIG. 1 is a top plan view of a conveying system according to the invention.

Referring now specifically to the drawings and the illustrative embodiments depicted therein, a conveying system 10 includes an endless conveying surface 12 defined by the uppermost ones of a plurality of support members, such as slats 14, connected in spaced parallel relationship with each other in an endless fashion (FIG. 1). A diverter shoe 16 is mounted to each slat 14 and is movable laterally along the slat with respect to the direction of movement of conveying surface 12. A plurality of take-off spurs 18, of which only one is illustrated, may extend laterally from conveying surface 12. Each take-off spur 18 includes a power driven take-away section 20 and a power driven accumulation section (not shown) downstream from the take-away section in the direction of the product flow. As illustrated, the leading packages 22a and 22b were not designated for sortation onto the illustrated spur 18. Accordingly, the diverter shoes 16 associated with the slats supporting package 22a remain on the lateral end of slat 14 that is opposite spur 18. A third package 22c is illustrated being diverted onto sortation spur 18. Accordingly, the diverter shoes associated with the slats supporting package 22c are being moved laterally along slats 14 progressively toward spur 18. Packages 22d and 22e have not yet reached the point where the diverter shoes associated with their supporting slat would be laterally moved in order to divert such packages onto spur 18.

As can be seen by reference to FIG. 1, conveying system 10 allows the packages to be spaced apart less than the length of each diverter shoe 16 in the direction of movement of conveying surface 12, as seen by comparing the spacing of packages 22a and 22b. Likewise, as can be seen by reference to package 22e, which has an overall length that is substantially no larger than the length of a diverter shoe 16 in the direction of movement of conveyor surface 12, sortation system 10 is capable of diverting such small packages.

Figure 2:
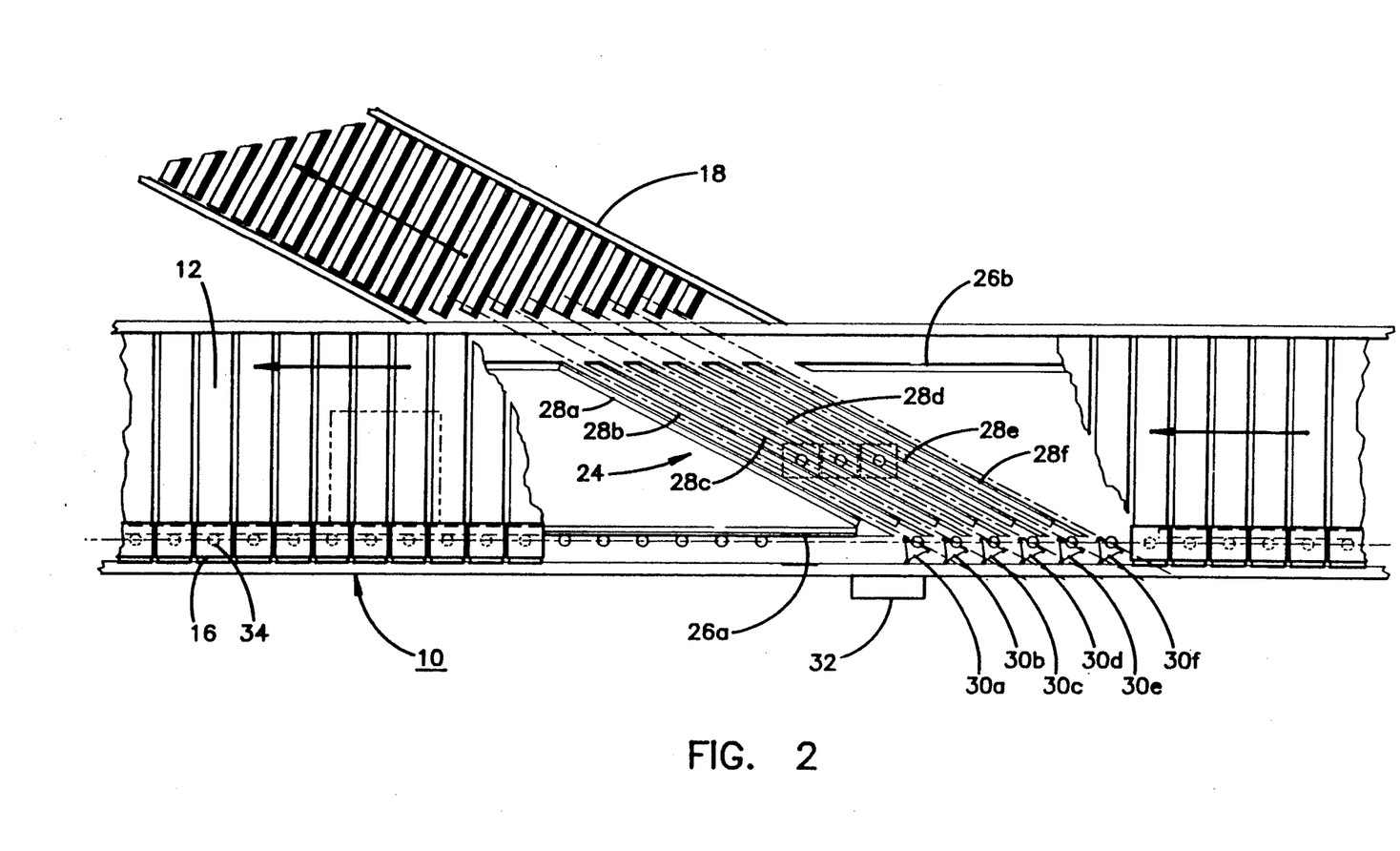
FIG. 2 is the same view as FIG. 1 with a portion of the conveying surface removed to reveal internal structure.

Shoe actuation means associated with each sortation spur 18 are provided for imparting a lateral force on shoes 16 to divert packages onto the spur. Such means include a guide track network 24 positioned just below conveying surface 12 (FIG. 2). Guide track network 24 includes a longitudinally extending guide track 26a on a left side of sortation system 10, in the direction of movement of conveying surface 12, and 26b on a right side of conveying surface 10. Guide track 26a is for the purpose of maintaining diverter shoes 16, that have not been diverted, from straying away from the left side of conveying surface 10. The purpose of guide track 26b is to keep diverter shoes that have already been diverted toward the right side of the conveying surface from straying away from the right side. Guide track network 24 additionally includes a plurality of diverter tracks 28a, 28b, 28c, 28d, 28e and 28f, which are generally parallel each other and extend diagonally across system 10, terminating in the proximity of spur 18. The shoe actuating means additionally includes a diverting gate 30a that is selectively actuatable for diverting shoes onto diverter track 28a, a diverting gate 30b that is selectively actuatable for diverting shoes onto diverting track 28b, and so forth, such that a diverting gate 30a-30f is associated with each diverting track 28a-28f. Each diverting gate 30a-30f may be of the structure illustrated in commonly assigned U.S. Pat. No. 5,038,912 issued to David Cotter and entitled VERTICALLY ACTUATED TRANSFER SWITCH. Diverting gates 30a-30f are individually selectively actuatable such that the diverting gates may be actuated concurrently in any combination thereof by a divert control module 32.

Each diverter shoe 16 includes a downwardly extending guide pin 34 which is engaged by the guide tracks, diverter tracks and diverting gates in order to impart movement to the shoes along the slats. Diverting tracks 38 are spaced apart, in the direction of movement of conveying surface 12, the same distance as the spacing between guide pins 34 of adjacent shoes. In this manner, the concurrent actuation of a plurality of adjacent diverting gates 30a-30f, will divert a series of adjacent diverting shoes 16 onto associated adjacent diverting tracks 28a-28f. This will cause the series of adjacent shoes to move laterally with respect to the conveying surface to divert a package 22c onto spur 18, as illustrated in FIG. 1, without rotating the package.

Figure 3:
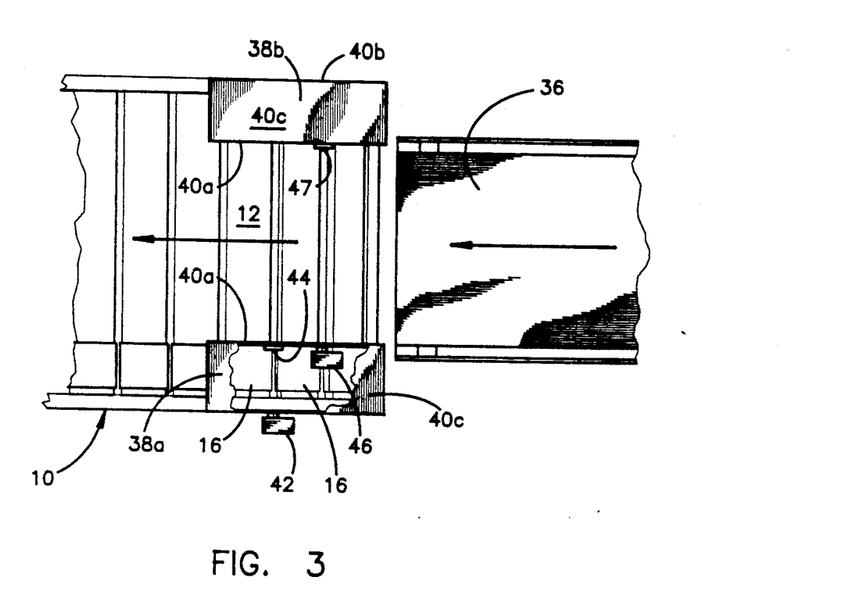
FIG. 3 is a top plan view of a package infeed portion of a conveying system.

Packages are supplied to conveying surface 12 from a slider-bed infeed conveyor 36 (FIG. 3). Conveying system 10 includes a pair of mounting brackets 38a, 38b adjacent infeed conveyor 36. Each bracket 38a, 38b includes an inner vertical wall 40a and outer vertical wall 40b which are spanned by a horizontal upper wall 40c. A portion of wall 40c for mounting bracket 38a is removed to reveal structure mounted internally to that mounting bracket This includes a shoe detector photosensor 42 mounted to wall 40b and a corresponding reflector 44 mounted to the interior of wall 40a of mounting bracket 38a. Additionally, a package detector update photosensor 46 is mounted to wall 40a of bracket 38a and a corresponding reflector 47 is mounted to wall 40a of bracket 38b. With this arrangement, a photobeam generated by photosensor 42 and reflected by reflector 44, is in the path of diverter shoes 16 as conveying surface 12 progressively moves. However, packages supported by conveying surface 12 do not affect photosensor 42. A photobeam generated by update photosensor 46 and reflected by reflector 47 is interrupted by packages deposited on conveying surface 12 from infeed conveyor 36. However, the photobeam generated by photosensor 46 is not affected by the movement of diverter shoes 16.

Figure 4:
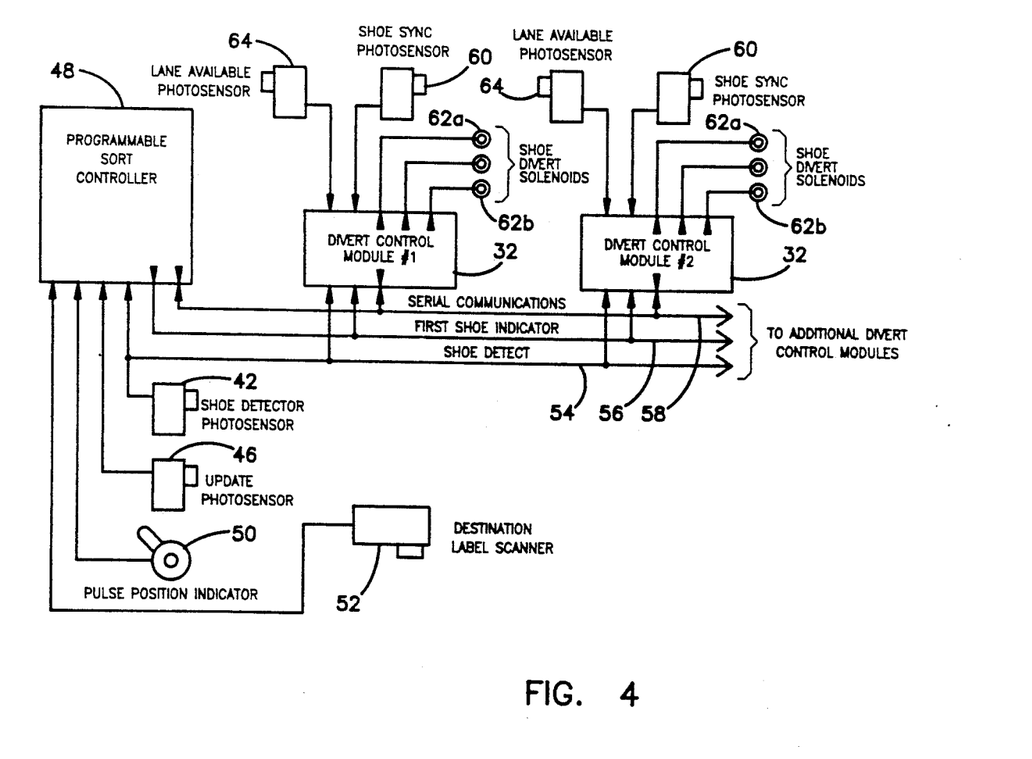
FIG. 4 is a block diagram of a control system according to the invention.

Photosensors 42 and 46 supply input signals to a central programmable sort controller 48, which additionally receives an input from a pulse position indicator (PPI) 50 that is responsive to the movement of conveying surface 12. PPI 50 provides output pulses that are a function of the incremented movement of the conveying surface (FIG. 4). Sort controller 48 also may receive inputs from a destination label scanner 52, which typically will be positioned above infeed conveyor 36 to read and decode standard product bar codes (not shown) printed on the side or top of packages 22. Programmable sort controller 48 is electrically interconnected with each divert control module 32, associated with a particular sortation spur 18, by a shoe detect line 54, a first-shoe indicator line 56 and a two-way serial communication line 58. Lines 54, 56 and 58 are common to all divert control modules 32. In this manner, electrical interconnections along conveying system 10, which may be many tens-of-feet long, are greatly simplified.

Each diverter control module 32 receives an input from a shoe-synchronizing photosensor 60. In contrast to the shoe detector photosensor 42 which monitors the leading and trailing edge of each shoe, shoe-sync photosensor 60 responds to the leading edge of the guide pin 34 of the shoe in order to provide precision actuation of the corresponding diverter gate 30a-30f. Each diverter control module 32 provides outputs to a plurality of shoe divert solenoids 62a-62f, each provided to operate an associated diverting gate 30a-30f. Each diverter control module 32 additionally receives an input from a lane-available photodetector 64, which is a back-up device to provide an indication of a full spur accumulation conveyor However, the status of slugs of accumulation of packages on each spur 18 is routinely provided by a dynamic accumulation routine that will be set forth in more detail below.

In operation, programmable sort controller 48 monitors shoe detector photosensor 42, update photosensor 46 and PPI 50. Each shoe is assigned a unique shoe ID number, which is encoded in system 10 during a calibration mode by a pulsing of the first shoe indicator line 56 once for each passage of the total number of shoes. Once synchronized, the sort controller 48 matches shoes, by ID number, with a package entering system 10, and establishes a data file for the package including its measured length, the first shoe associated with that package and a package identifier to identify the destination spur to which it is to be sorted. The destination spur could be manually entered into the system. In a preferred embodiment, however, sort controller 48 is programmed to select the destination spur in response to the product code on the package read by destination label scanner 52. As each package travels along conveying surface 12 between infeed conveyor 36 and the sortation spurs 18, it arrives at a preestablished divert activation point. At this point, the programmable sort controller 48 makes a determination of which shoes, by their unique ID number, will be diverted with the package, or that the package cannot be diverted for reasons that will be set forth in more detail below. A packet of data is then transmitted over serial communication line 58 from the sort controller to the divert control modules. When the package reaches the appropriate divert control module, the divert control module waits for the first shoe of the package to reach the last diverting gate 30a-30f. If the lane is determined to be available, the diverting gates will be actuated upon the receipt of an indication from the shoe-sync photosensor 60. The length of the diverted package is then incremented to a dynamic accumulation value for the spur to which it is diverted to determine when the spur is available and when it cannot accept packages If the spur is not available, the divert control module will not actuate the diverting gates and would report the status to the programmable sort control over serial communication line 58.

Figure 5A:
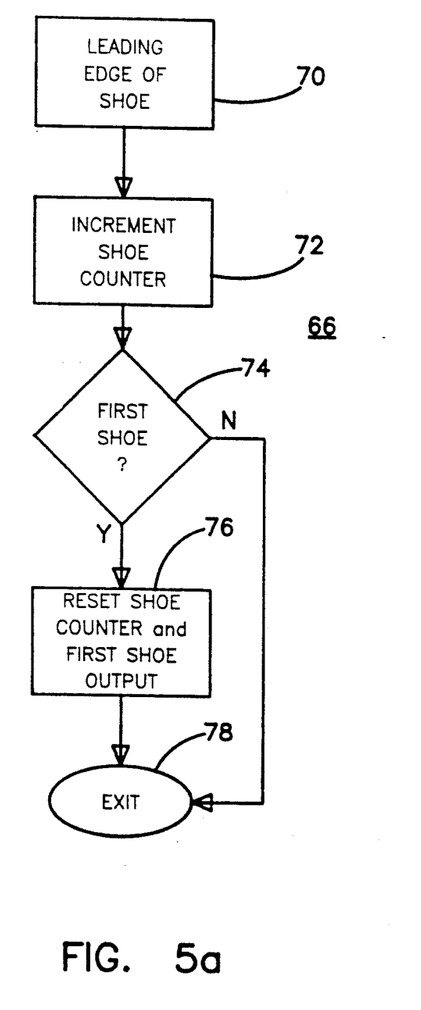
FIGS. 5a and 5b are flow charts illustrating a portion of a control program which detects the leading and trailing edges of diverter shoes.
Figure 5B:
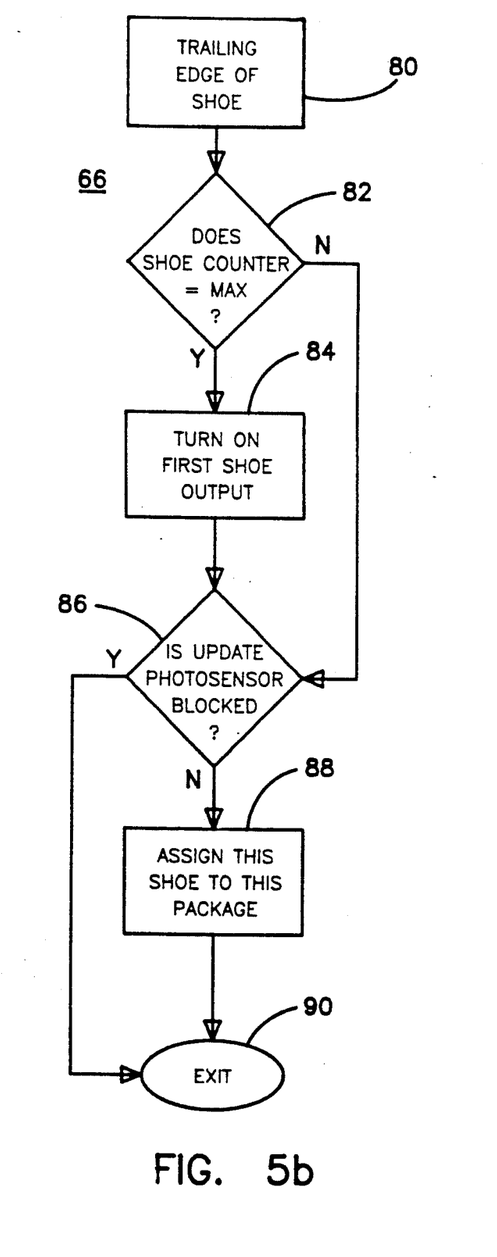

Conveying system 10 includes a control program 66 for program sort controller 48 and a control program 68 for each diver module 32. Program 66 is structured as follows (FIGS. 5a-7d, and 9). When shoe detector photosensor 42 is interrupted by the leading edge of a diverter shoe, a calling program calls a "leading edge of shoe" routine 70 which increments a shoe counter 72 and determines at 74 whether the beam was interrupted by a first shoe by examining the contents of a shoe counter (FIG. 5a). If so, the shoe counter is reset at 76, and a first shoe output is provided on line 56 to all divert control modules 32. Control is returned at 78 to the calling routine When the shoe detection photosensor senses reestablishment of the beam upon the passing of a shoe, the calling routine calls a "trailing edge of shoe" routine 80 which then determines at 82 whether the shoe counter has reached a maximum value at 82 (FIG. 5b). If so, the first shoe output 56 is turned on at 84. If not, control then passes to 86 where it is determined whether the update photosensor is interrupted. If so, control passes to 88 where it is indicated in a data file that the particular shoe is assigned to the package interrupting the update photosensor If it is determined at 86 that the update photosensor is not blocked, then step 88 is bypassed and control returns to the calling routine at 90.

Figure 6A:
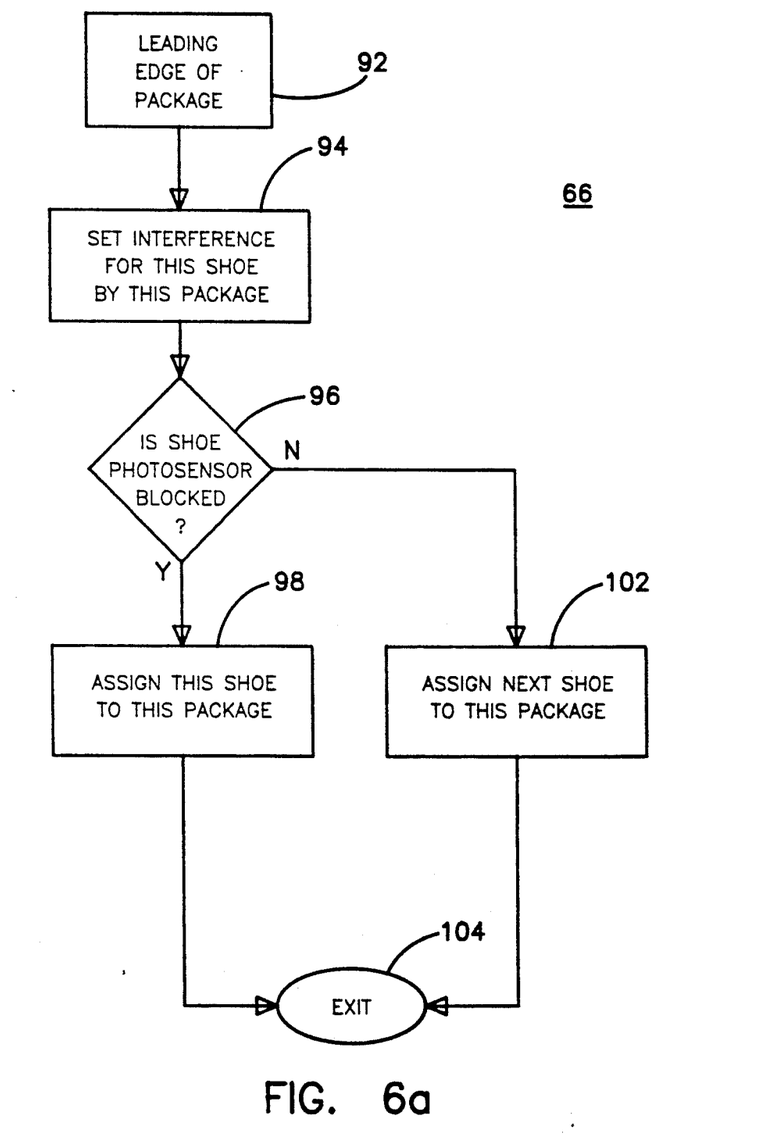
FIGS. 6a and 6b are flow charts illustrating a portion of a control program which detects the leading and trailing edges of packages.

When a package is deposited onto conveying surface 12 from infeed conveyor 36, the interruption of the beam of update photosensor 46 causes the calling routine to call "leading edge of package" routine 92 (FIG. 6a). An entry in a data file is made at 94 that the most recent shoe is interfered with by this package The program then determines at 96 whether the shoe detector photosensor 42 is being interrupted by a shoe. If so, the particular shoe is assigned to the particular package, whose leading edge interrupted photosensor 46, at 98. If it is determined at 96 that there is no interruption of the beam of shoe detection photosensor 42, then control passes to 102 where the next shoe is assigned to the package interrupting photosensor 46. Control is then returned to the calling program at 104.

Figure 6B:
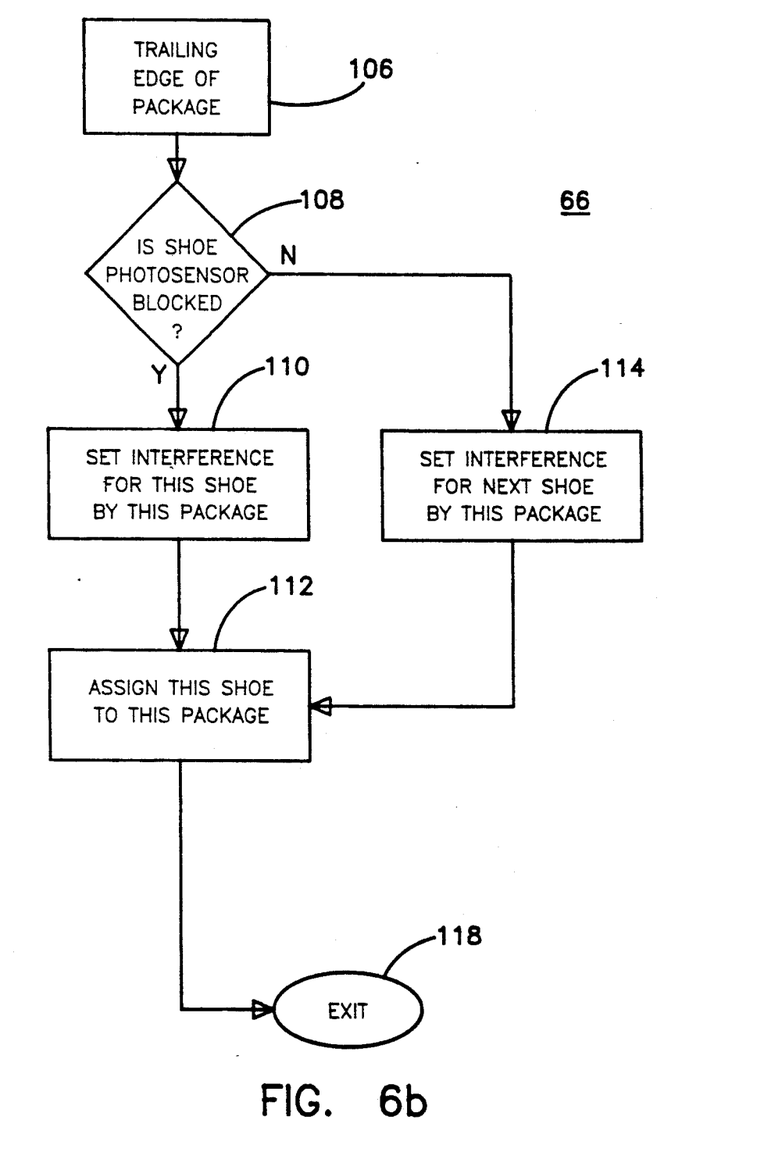

When the beam for update photosensor 46 is reestablished after the passage of a package, the calling routine calls a "trailing edge of package" routine 106 (FIG. 6b). It is then determined at 108 whether the shoe detector photosensor 42 is blocked. If it is, then it is established in a data file that the shoe blocking the shoe detection photosensor is hindered by the package at 110 and the shoe is assigned to the package at 112. If the shoe detector photosensor is not blocked, the data file is provided with information at 114 that the next shoe is hindered by this package. Control then passes to 112 where the shoe that just passed the shoe detector photosensor is assigned to this package. Control is returned to the calling program at 118.

Figure 7A:
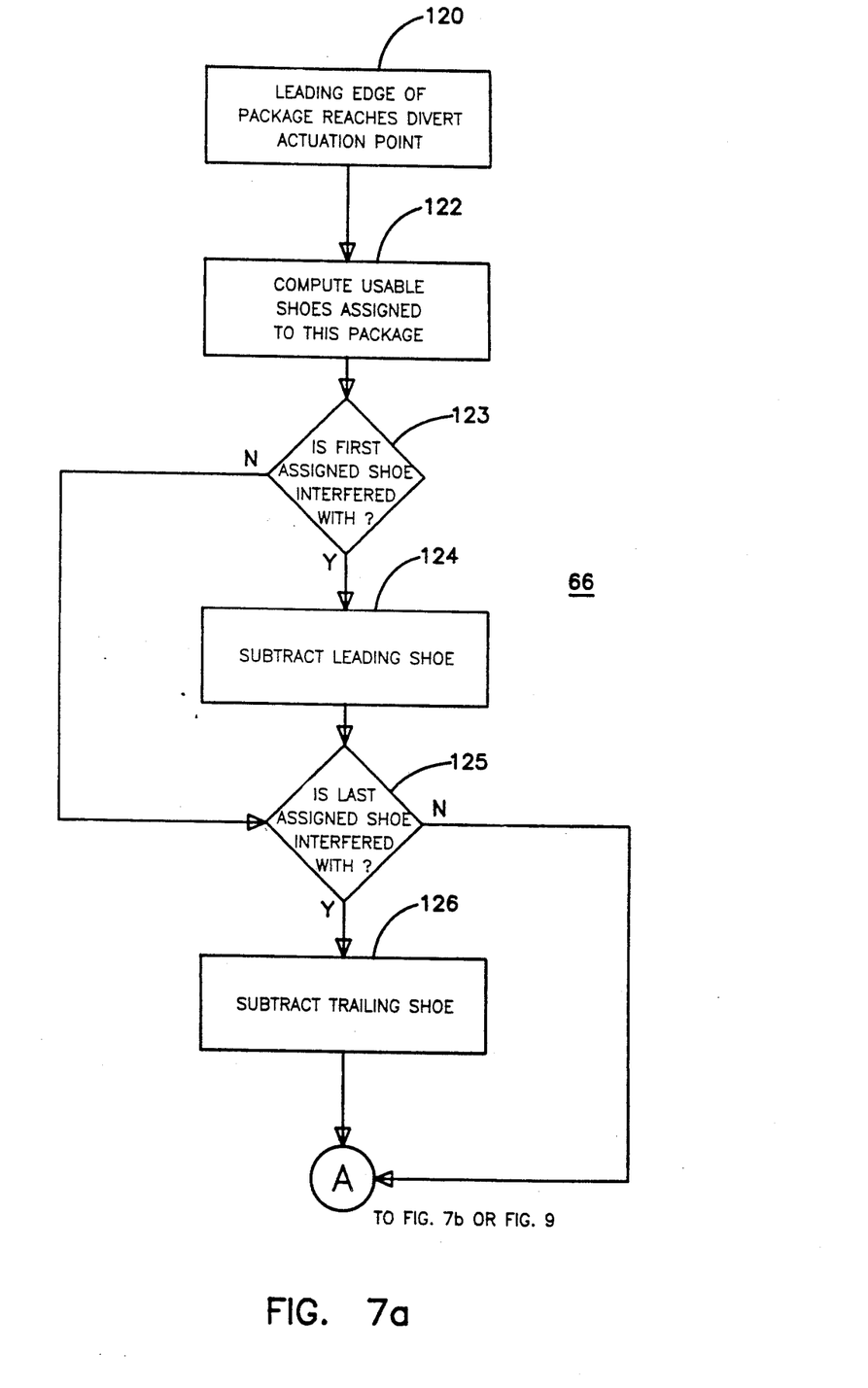
FIGS. 7a, 7b and 7c are flow charts illustrating a portion of a control program that is executed when a leading edge of a package reaches a divert actuation point.

Therefore, it can be seen that control program 66 assigns shoes, each of which has a unique identification number as assigned by sort controller 48, with particular packages. Additionally, it is determined whether each shoe is interfered with by a leading or following package. After the package moves along conveying surface 12 past update photosensor 46, it reaches a point, which may be defined as a physical position or the lapse of time, or the like, which is referred to as a DIVERT ACTUATION POINT. When the leading edge of a package reaches the DIVERT ACTUATION POINT, the calling routine calls a function 120 (FIG. 7a), and the program computes the usable shoes assigned to the particular package at 122. This is an initial determination of the shoes that have been assigned during the shoe assignment process previously set forth. After the shoes assigned to the package have been computed at 122, then it is determined at 123 whether the first assigned, or leading, shoe is interfered with by the previous package. If so, the first assigned shoe is subtracted at 124. It is then determined at 125 whether the last assigned, or trailing, shoe is interfered with by the following package If so, the last assigned shoe is subtracted at 126.

Figure 7B:
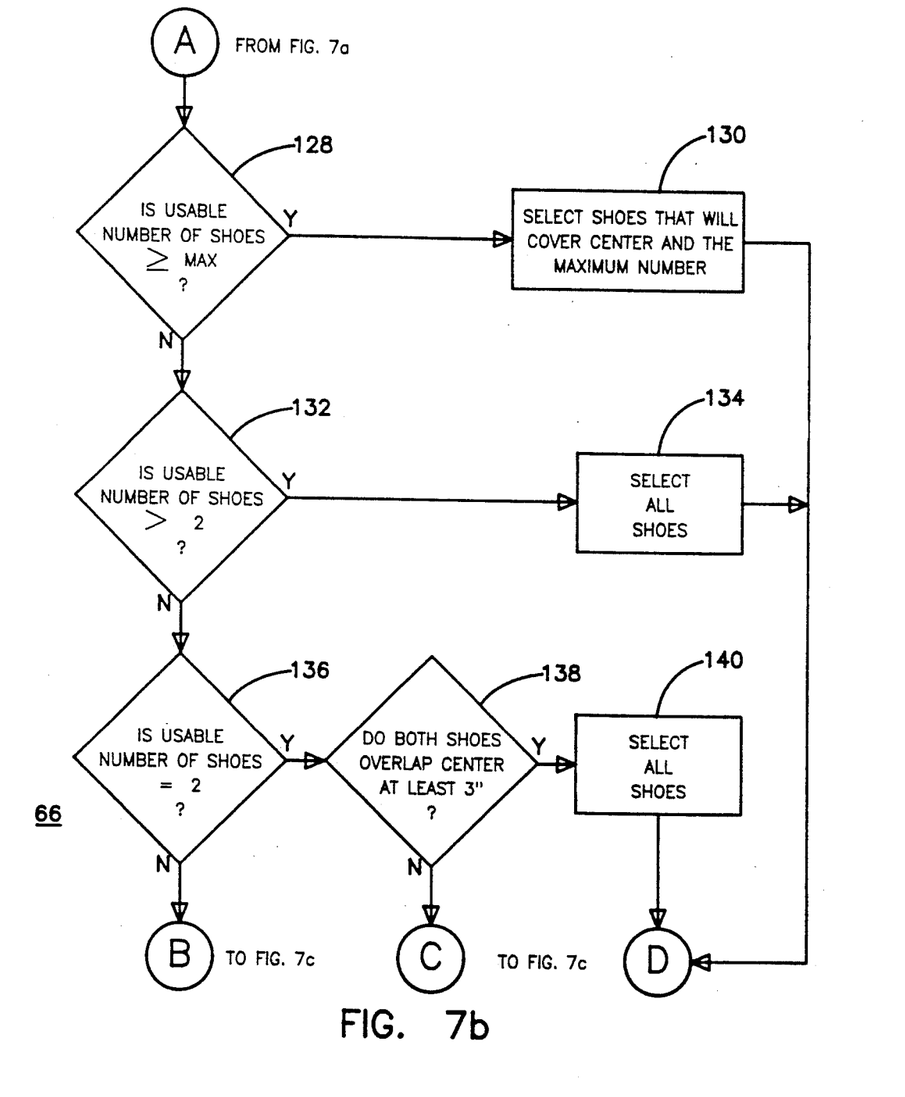
Figure 7C:
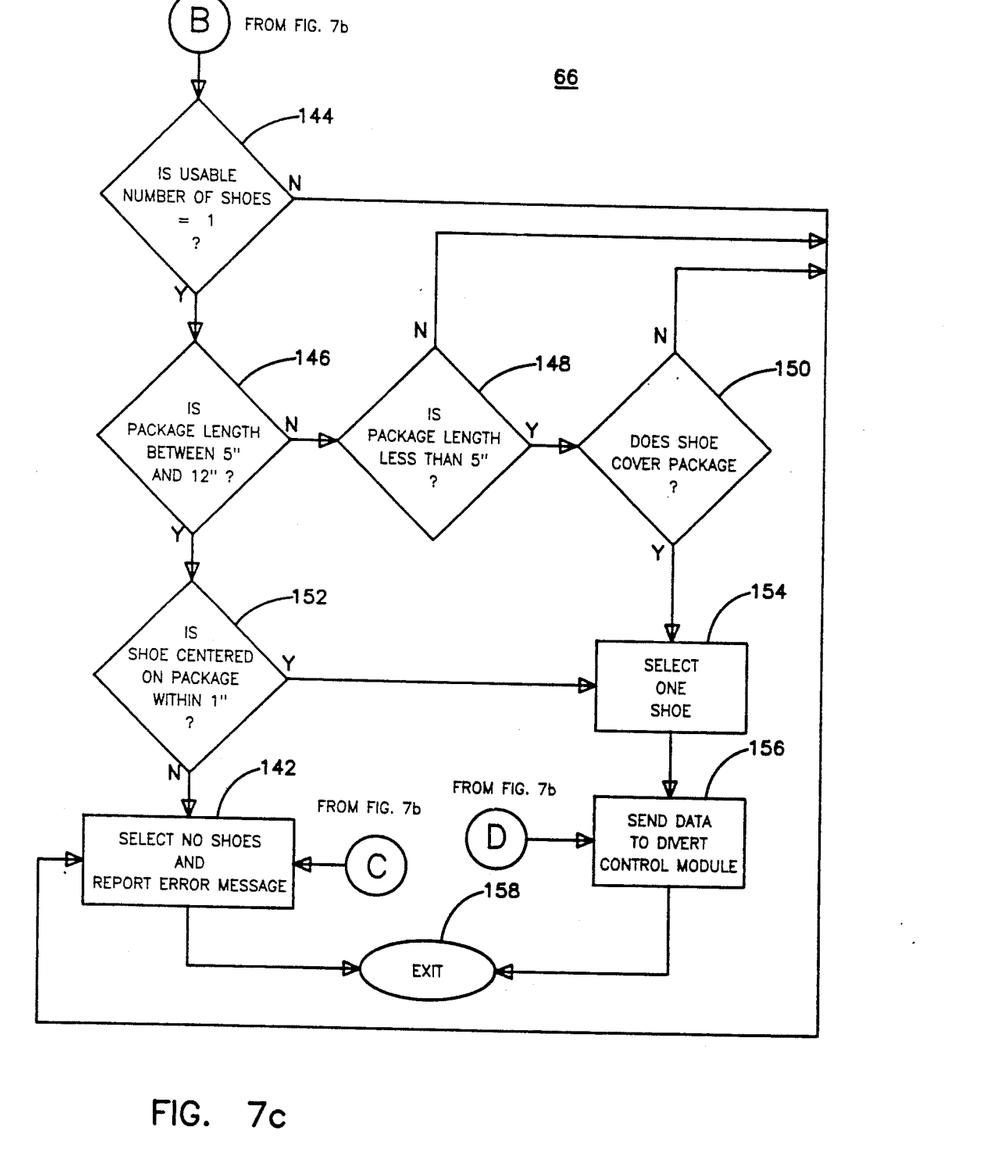

The program then determines at 128 if the number of usable shoes is greater than or equal to a preselected maximum number of shoes (FIG. 7b). If so, the program selects at 130 the particular shoes that cover the center, by calculating the position of the longitudinal center of the package and the shoes that are closest to, but on opposite sides of, such center. When these shoes have been identified, the maximum number of shoes are selected to include such shoes. If it is determined at 128 that the usable number of shoes is not greater than or equal to the maximum, the program then determines at 132 whether the usable number of shoes is greater than two. If so, then the program selects all of the shoes at 134. If the usable number of shoes is not greater than two, the program determines at 136 whether the usable number of shoes is equal to two. If so, the control then determines at 138 whether the two shoes extend in both directions beyond the longitudinal center of the package by at least three inches. If so, all of the shoes are selected at 140. If it is determined at 138 that both shoes do not extend in both directions beyond the center by at least three inches, then control passes to 142 (FIG. 7c). At 142, no shoes will be selected and an error message is reported that the package is a non-sortable package.

If it is determined at 136 that the usable number of shoes is not equal to two, control passes to 144 where it is determined whether the number of usable shoes is equal to one (FIG. 7c). If the usable shoes are not equal to one, then control passes to 142, no shoes are selected and an error message is generated. If the number of usable shoes is equal to one, control passes to 146 where it is determined whether the length of the package is between five inches and twelve inches. If the length of the package is not between five inches and twelve inches, then control passes to 148 where it is determined whether the length of the package is less then five inches If so, then control passes to 150 where it is determined whether the single assigned shoe covers the package in the longitudinal sense. This is determined by comparing the position of the leading edge and the trailing edge of the package with the leading edge and trailing edges of the shoe. If so, the one shoe is selected at 154. If it is determined at 148 that the package is not less than five inches long, or if it is determined at 150 that the shoe does not cover the package, then control passes to 142, no shoes are selected and an error message is generated.

If it is determined at 146 that the package is between five inches and twelve inches in length, then control passes to 152 where it is determined whether the individual shoe is centered on the package within one inch of the longitudinal centerline of the package. If so, then the one shoe is selected at 154. If it is determined at 152 that the shoe is not centered on the package within one inch of the centerline of the package, then control passes to 142, no shoes are selected and an error message is generated.

Figure 9:
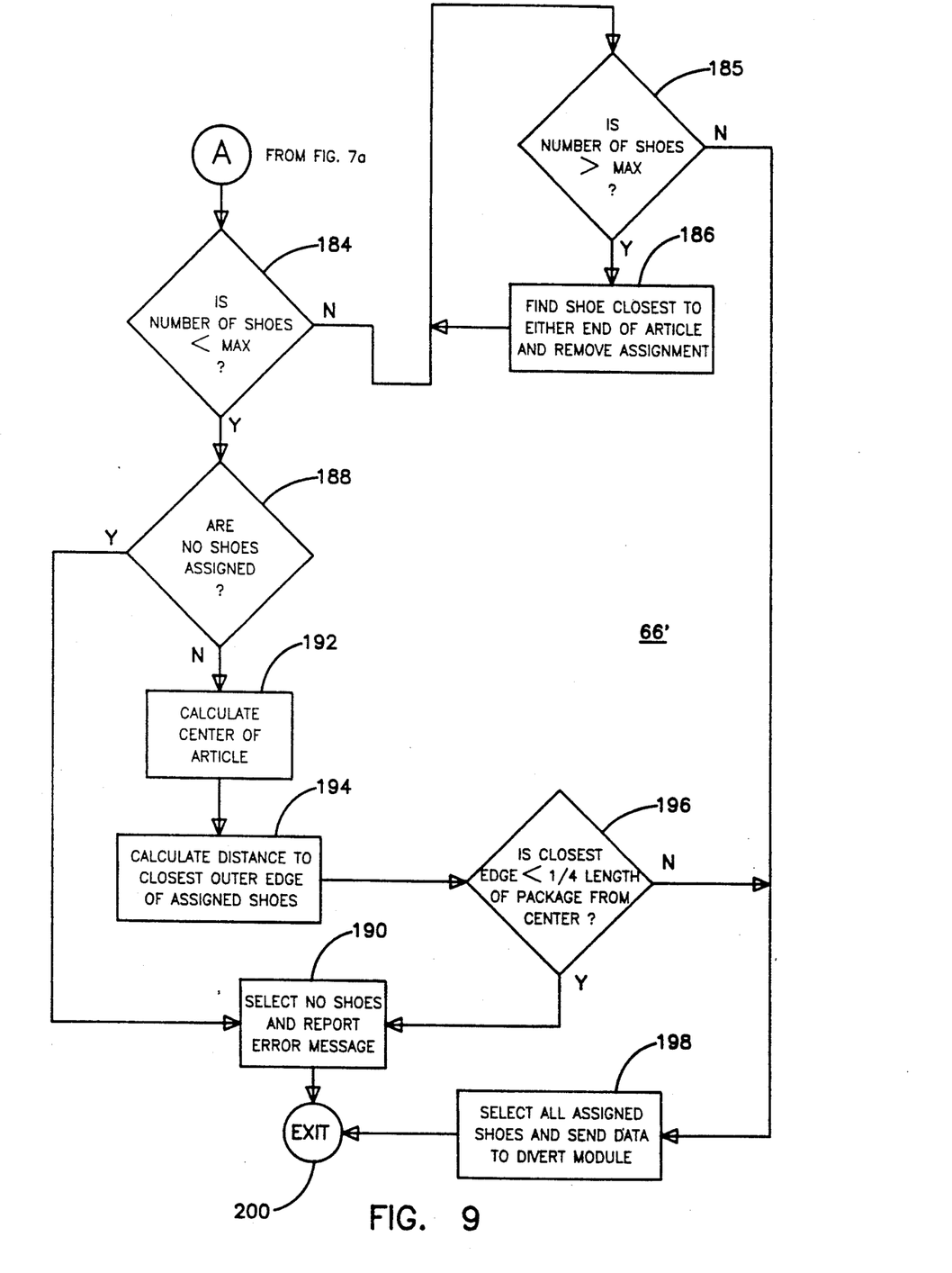
FIG. 9 is a flow chart illustrating an alternative embodiment of the control program illustrated in FIGS. 7b and 7c.

An alternative to the portion of control program 66, illustrated in FIGS. 7b and 7c, is illustrated in FIG. 9. After the particular shoes are initially assigned to each package (122-126), control 66' determines at 184 whether the number of assigned shoes is less than the maximum number that may be handled by each divert area. If not, then control is passed to 185 which determines if there are more than the maximum number of assigned to the package. If so, then control passes to 186 where the shoe that is closest to the end of the package is located and the assignment of that shoe is removed and control is returned to 185. Any shoes exceeding the maximum number are removed in this manner Control then passes to 198 where all remaining shoes are selected for that package. If it is determined at 184 that the number of assigned shoes is less than the maximum, control passes to 188 where it is determined whether any shoes are assigned to the given package. If there are no shoes assigned, an error message is reported to the sort controller at 190.

If it is determined at 188 that there are shoes assigned, the control calculates at 192 the centerline of the package in the direction of movement of the package, from the previously determined forward and trailing edge data for that package. Control then passes to 194 where the data for the leading edge and the trailing edge of the group of shoes that have been assigned to the package are compared with the center of the package calculated at 192. The vector distance to the closest of the leading and trailing edges of the assigned shoes from the package centerline is compared with the length of the package 196. If the distance is less than one quarter of the length of the package, then control passes to 190, where no shoes are selected and an error message is generated. If the distance from the center of the package to the closest of the leading and trailing edges of the assigned shoe is greater than one quarter of the length of the package, then control passes to 198 where all shoes assigned to that package are selected and the data is sent to the divert control module. Control then passes to 200 where control is returned to the calling program.

Program 66' ensures that the shoes assigned to a package extend, in both directions, beyond the centerline of that package by at least a given percentage of the package length. While the predetermined percentage may vary based upon parameters such as the range of package sizes, coefficients-of-friction of the conveyor/package interface, and other parameters, it has been determined that, in the illustrated embodiment, the value of 0.25, or 25%, of package length conservatively avoids the rotation of packages. Program 66' is a preferred embodiment because of its logic is direct and compact. The program is able to function by comparing the vector distance of the centerline of the package to the closest leading or trailing edge of the group of shoes assigned to the package in order to determine whether, and by how much, the shoes extend in both directions beyond the package centerline. If only one shoe is assigned to the package, then its leading and trailing edges are the edges evaluated at program step 194. If multiple shoes are assigned to the package, then the leading edge of the leading shoe and the trailing edge of the trailing shoe are the edges evaluated in step 194. If the number of assigned shoes is greater than, or equal to, the maximum permissible assigned shoes, the centerline evaluation is bypassed because it is assumed that a sufficient number of shoes are available to displace packages of any normally encountered length.

If shoes are selected for a particular package (130, 134, 140, 154, 198) then the following data is sent to the divert control modules 32 over serial communication line 58:

CONTROL MODULE ADDRESS
PACKAGE IDENTIFIER
FIRST SHOE ID NUMBER
NUMBER OF SHOES
LENGTH OF PACKAGE

Control returns to the calling routine at 158.

Figure 8:
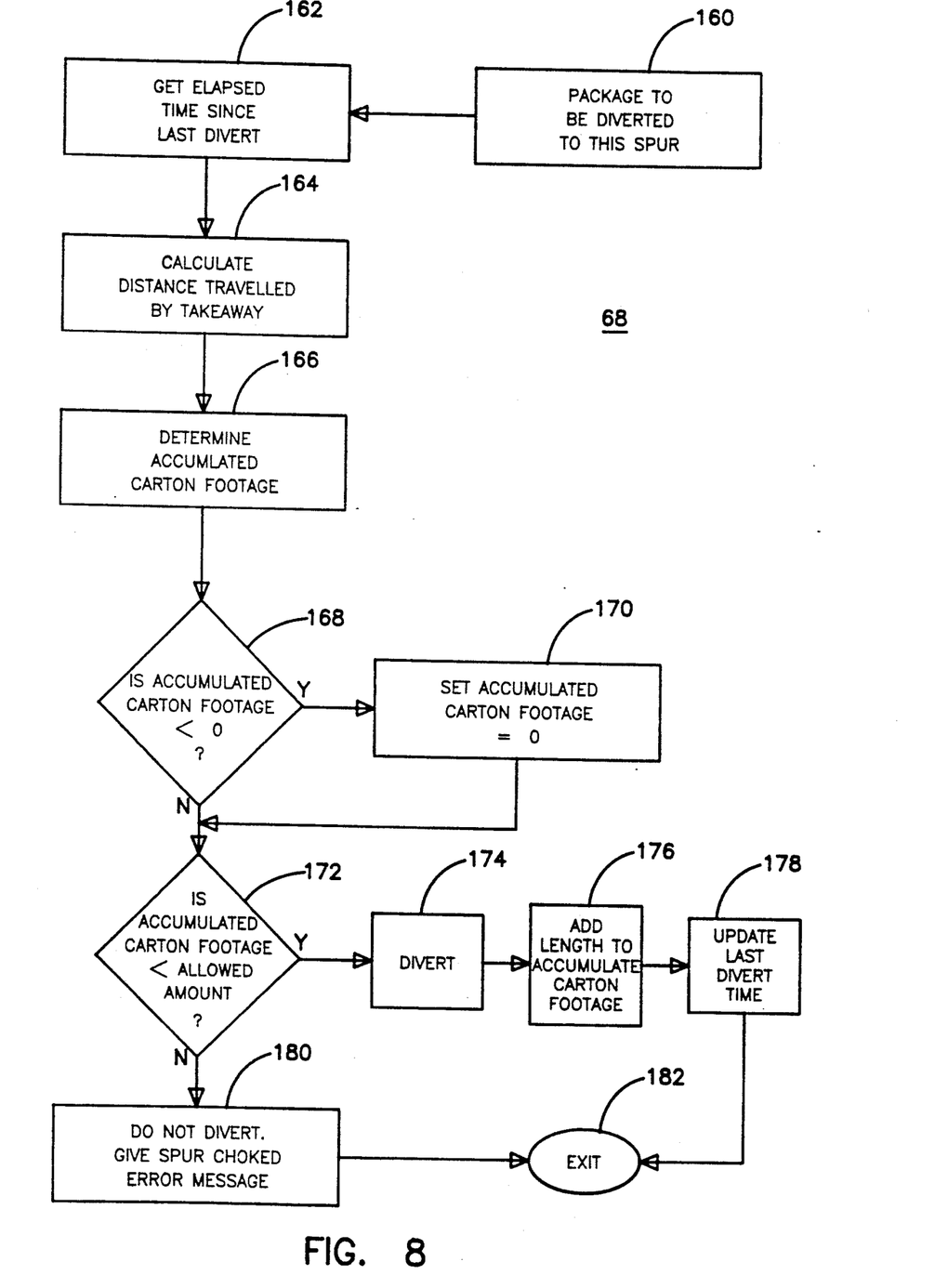
FIG. 8 is a flow chart illustrating a portion of a control program that monitors the accumulation of packages that will occur on an accumulation conveyor.

After it has been determined that a package can be sorted at a divert, the divert control module that is to divert the package determines its availability by performing routine 68 (FIG. 8). When the calling program calls a "package to be diverted to this spur" routine at 160, the control gets the elapsed time since the LAST DIVERT time at 162. The distance that the take-away conveyor has travelled is determined at 164 using the LAST DIVERT time and the TAKE-AWAY speed. The TAKE-AWAY speed is a factory set parameter set to the speed of the take-away conveyor. The take-away conveyor is assumed to be running whenever the particular divert control module is active. The ACCUMULATED CARTON footage is then determined at 166 as the prior ACCUMULATED CARTON footage minus the distance the take-away conveyor has travelled from the last divert time. Control then passes to 168 where it is determined whether the ACCUMULATED CARTON footage would be less than zero. If so, then control passes to 170 where the ACCUMULATED CARTON footage is reset to zero. If not, control passes to 172 where it is determined whether the ACCUMULATION CARTON footage would be less than an ALLOWED DYNAMIC ACCUMULATION. The ALLOWED DYNAMIC ACCUMULATION is a factory set parameter which indicates the amount of product which can be diverted onto a take-away conveyor without the lower-speed accumulation section (not shown) being over-loaded.

If it is determined at 172 that the ACCUMULATED CARTON footage is less than the ALLOWED DYNAMIC ACCUMULATION, then the package is diverted at 174. The length of the package is then added to the ACCUMULATED CARTON footage at 176 and the LAST DIVERT time is updated at 178. If the ACCUMULATED CARTON footage will not be less than the allowed amount, then the package is not diverted (180) and a lane choked error message is provided to the sort controller. Control is then returned to the calling routine at 182. Once the divert control module determines that the take-away conveyor is available, it would wait for the first shoe assigned to the particular package to reach the spur and monitor the output of the shoe-sync photodetector 60 which monitors the leading edge of the guide pin for the shoe. When this occurs, the divert control module would concurrently actuate the number of diverting gates corresponding to the selected number of shoes and would report the diversion of the package to sort controller 48 over serial communication line 58.

While the various aspects of the present invention provide a unique system for sorting packages in a manner that significantly reduces the spacing between packages, the aspects may be usable individually with other known conveyor systems in order to improve system performance. For example, the unique capabilities of the control set forth above to monitor the relative positions of the diverting shoes with respect to the position of the packages in order to determine interference with leading and following packages, as well as to allow diverting with two or even one shoe(s), may be useful with sortation systems that utilize a single divert track and that rotate the package during diverting. Similarly, the use of an allowed dynamic accumulation to establish the availability of a particular sortation spur in order to minimize the unavailability of each spur, may be useful with other sortation systems.

Although the invention is illustrated embodied in a positive displacement sortation system, having laterally extending spurs, its principles would find application in conveying systems in which articles are laterally diverted for other purposes. By way of example, the present invention could be used to divert articles to a parallel conveyor. Also, the invention would find application for lateral displacement of articles on the conveying surface without diverting from the surface for the purpose of flow-splitting or merging Other changes and modifications in the specifically described embodiments can be carried out without departing from the principles of the invention, which is intended to be limited only by the scope of the appended claims, as interpreted according to the principles of patent law, including the Doctrine of Equivalents.

The embodiments of the invention in which an exclusive property or privilege is claimed are defined as follows:

1. In a conveying system having a longitudinally moving conveying surface defined by the uppermost ones of a plurality of elongated support members connected in spaced relation with each other in an endless web, a plurality of diverter shoes each movably mounted on one of said support members for lateral movement with respect to said conveying surface and actuating means engaging said diverter shoes for imparting a lateral force to move said diverter shoes laterally to displace articles positioned on said conveying surface, said actuating means comprising:
   means for independently selectively moving at least one of said diverter shoes laterally while maintaining lengthwise alignment of all selected diverter shoes in order to displace articles of varying lengths supported on said conveying surface transversely without rotation of the diverted article; and
   control means for selecting particular diverter shoes to divert a particular article including means for measuring relative position between diverter shoes and articles, wherein said control means includes means for identifying a diverter shoe that is selected to divert more than one article and for eliminating the selection of that diverter shoe.

2. The conveying system in claim 1 wherein said means for independently selectively moving includes a plurality of spaced apart generally parallel track members terminating in the vicinity of said spur, a diverter associated with each of said track members for selectively diverting one of said diverter shoes onto the associated one of said track members, and wherein said control means selectively operates each said diverter to divert selected ones of said shoes onto said track members.

3. The conveying system in claim 2 wherein said trackmembers are spaced apart by substantially the length of said diverter shoes in the direction of movement of said conveying surface.

4. In a conveying system having a longitudinally moving conveying surface defined by the uppermost ones of a plurality of elongated support members connected in spaced relation with each other in an endless web, a plurality of diverter shoes each movably mounted on one of said support members for lateral movement with respect to said conveying surface and actuating means engaging said diverter shoes for imparting a lateral force to move said diverter shoes laterally to displace articles positioned on said conveying surface, said actuating means comprising:
   means for independently selectively moving at least one of said diverter shoes laterally while maintaining lengthwise alignment of all selected diverter shoes in order to displace articles of varying lengths supported on said conveying surface transversely without rotation of the diverted articles; and
   control means for selecting particular diverter shoes to divert a particular article including means for measuring relative position between diverter shoes and articles, wherein said control means includes means for determining the lengthwise centerline of articles and means for determining whether the diverter shoe or diverter shoes selected for an article overlap the centerline sufficiently to displace the associated article.

5. In a conveying system having a longitudinally moving conveying surface defined by the uppermost ones of a plurality of support members connected in spaced relation with each other in an endless web, a plurality of diverter shoes each movably mounted on one of said support members for lateral movement with respect to said conveying surface, and actuating means engaging said diverter shoes for imparting a lateral force to move said diverter shoes laterally to displace articles positioned on said conveying surface, said actuating means comprising:
   track means for guiding said diverter shoes laterally;
   diverting means that is operable to divert said diverter shoes to said track means;
   control means for selectively operating said diverting means, said control means including
      first sensing means for sensing the position of articles on said conveying surface,
      second sensing means for sensing the position of diverter shoes on said conveying surface,
      determining means responsive to said first and second sensing means for determining the relative spacing between said diverter shoes and said articles in the direction of movement of said conveying surface, for identifying individual ones of said diverter shoes, for assigning individual diverter shoes to an article, and for determining whether an individual diverter shoe interferes with an article that is leading or trailing an article to which the individual diverter shoe is assigned, and
      means responsive to said determining means for operating said diverting means.

6. In a conveying system having a longitudinally moving conveying surface defined by the uppermost ones of a plurality of support members connected in spaced relation with each other in an endless web, a plurality of diverter shoes each movably mounted on one of said support members for lateral movement with respect to said conveying surface, and actuating means engaging said diverter shoes for imparting a lateral force to move said diverter shoes laterally to displace articles positioned on said conveying surface, said actuating means comprising:
   track means for guiding said diverter shoes laterally;
   diverting means that is operable to divert said diverter shoes to said track means;
   control means for selectively operating said diverting means, said control means including
      first sensing means for sensing the position of articles on said conveying surface,
      second sensing means for sensing the position of diverter shoes on said conveying surface,
      determining means responsive to said first and second sensing means for determining the relative spacing between said diverter shoes and said articles in the direction of movement of said conveying surface, for identifying individual ones of said diverter shoes, for assigning individual diverter shoes to an article, and for determining whether the number of diverter shoes assigned to an article exceeds a predetermined maximum number of diverter shoes, and
      means responsive to said determining means for operating said diverting means.

7. The conveying system in claim 6 wherein said control means includes means for calculating the centerline of said article in the direction of movement of said conveying surface and means for determining the distance between said centerline and each of a leading edge and trailing edge of the group shoe(s) assigned to that article.

8. The conveying system in claim 7 wherein said control means includes means for determining whether each of said distances is at least a predetermined proportion of the length of that article in the direction of movement of said conveying surface.

9. The conveying system in claim 5 wherein said control means includes means for determining whether one of said shoes covers an article in the direction of movement of said conveying surface.

10. The conveying system in claim 5 wherein said control means further includes means for sensing movement of said conveying surface.

11. The conveying system in claim 5 wherein said track means includes a plurality of generally parallel track members terminating in the vicinity of one of said spurs and wherein said diverting means includes a plurality of diverters, one of said diverters associated with each of said track members for selectively diverting one of said diverter shoes onto the associated one of said track members.

12. In a convoying system having a longitudinally moving conveying surface and a plurality of sortation spurs, each including a powered accumulation conveyor extending laterally from said conveying surface, said conveying surface defined by the uppermost ones of a plurality of support members connected in spaced relation with each other in an endless web; said system further including a plurality of diverter shoes each movably mounted on one of said supports members for lateral movement with respect to said conveying surface, and actuating means engaging said diverter shoes for imparting a lateral force to move said diverter shoes laterally to divert articles positioned on said conveying surface onto one of said spur, said actuating means comprising:
  track means for guiding said diverter shoes laterally;
  diverting means that is operable to divert diverter shoes to said track means; and
  control means for selectively operating said diverting means, said control means including means for determining the length of articles, operating means for selectively operating the diverting means for the associated spur to divert articles onto that spur, means for determining the moment in time that said operating means last operated the diverting means for a selected spur and the distance that the accumulation conveyor for that spur travelled after said moment in time, and means for determining an accumulated article length parameter for at least one spur, wherein said control means determines said accumulated article length parameter at least in part from the length of articles selected to be diverted to that particular spur, and at least in part from said distance.

13. The conveying system in claim 12 wherein said control means operates the diverting means for a selected spur when the particular article is adjacent that spur provided that said accumlated article length parameter for said associated spur is not above a predetermined value.

14. The conveying system in claim 12 wherein said control means further includes means for sensing relative spacing between said shoes and articles in the direction of movement of said conveying surface.

15. The conveying system in claim 14 wherein said control means includes means for identifying individual ones of said shoes and means for assigning individual ones of said shoes to a particular article.

16. The conveying system in claim 12 wherein said track means includes a plurality of generally parallel track members terminating in the vicinity of one of said spurs and wherein said diverting means includes a plurality of diverters, one of said diverters associated with each of said track members for selectively diverting one of said diverter shoes onto the associated one of said track members.

17. In a conveying system having a longitudinally moving conveying surface and a plurality of sortation spurs, each spur including a powered accumulation conveyor extending laterally from said conveying surface, said conveying surface defined by the uppermost ones of a plurality of support members connected in spaced relation with each other in an endless web; said system further including a plurality of diverter shoes each movably mounted on one of said support members for lateral movement with respect to said conveying surface, and actuating means engaging said diverter shoes for imparting a lateral force to move said diverter shoes laterally to divert articles positioned on said conveying surface onto one of said spurs, said actuating means comprising:
  track means for guiding said diverter shoes laterally;
  diverting means that is operable to divert diverter shoes to said track means; and
  control means for selectively operating said diverting means, said control means including
    a central sort controller including means for determining the length of articles,
    a plurality of local controllers, each of said local controllers associated with one of said spurs for selectively operating the diverting means for the associated spur to divert articles onto that spur,
    means for transferring from said sort controller to said local controllers data indicating the length of articles,
    wherein each of said local controllers includes means for determining the moment in time that it last operated the associated diverting means and the distance that the accumulation conveyor of the associated said spur travelled after said moment in time, and means for determining an accumulated article length parameter for the associated spur at least in part from the data transferred from the sort controller and at least in part from said distance.

18. The conveying system in claim 17 wherein said control means includes means for transferring from said sort controller to said local controllers data indicating for each article the spur to which that particular package is to be diverted.

19. The conveying system in claim 18 wherein each of said local controllers responds to data indicating that a particular article is to be diverted to its associated spur by operating the associated diverting means when the particular article is adjacent said associated spur provided that said accumulated article length parameter for said associated spur is not above a predetermined value.

20. The conveying system in claim 17 wherein said sort controller further includes means for sensing relative spacing between said shoes and articles in the direction of movement of said conveying surface.

21. The conveying system in claim 20 wherein said sort controller includes means for identifying individual ones of said shoes and means for assigning individual ones of said shoes to a particular article.

22. The conveying system in claim 21 wherein said means for transferring transfers the identity of the ones of said shoes assigned to each article.

23. The conveying system in claim 17 wherein said track means includes a plurality of generally parallel track members terminating in the vicinity of one of said spurs and wherein said diverting means includes a plurality of diverters, one of said diverters associated with each of said track members for selectively diverting one of said diverter shoes onto the associated one of said track members.

24. In a conveying system having a longitudinally moving conveying surface defined by the uppermost ones of a plurality of support members connected in spaced relation with each other in an endless web, a plurality of diverter shoes each movably mounted on one of said support members for lateral movement with respect to said conveying surface, and actuating means engaging said diverter shoes for imparting a lateral force to move said diverter shoes laterally to displace articles positioned on said conveying surface, said actuating means comprising;

track means for guiding said diverter shoes laterally;

a diverter switch that is operable to divert said diverter shoes to said track means;

control means for selectively operating said diverter switch, said control means including first sensing means for sensing the position of articles on said conveying surface, second sensing means for sensing the position of diverter shoes, determining means responsive to said first and second sensing means for determining the relative spacing between said diverter shoes and said articles in the direction of movement of said conveying surface, for identifying individual ones of said diverter shoes, for assigning individual diverter shoes to an article, for calculating the centerline of said article in the direction of movement of said conveying surface, and for determining the distance between said centerline and each of a leading edge and trailing edge of the group diverter shoe(s) assigned to that article, and means responsive to said determining means for operating said diverter switch.

25. The conveying system in claim 24 wherein said control means includes means for determining whether each said distance is at least a predetermined proportion of the length of that article in the direction of movement of said conveying surface.

26. The conveying system in claim 24 wherein said control means includes means for determining whether one of said diverter shoes covers an article in the direction of movement of said conveying surface.

27. The conveying system in claim 24 wherein said control means further includes means for sensing movement of said conveying surface.

28. The conveying system in claim 4 wherein said means for independently selectively moving includes a plurality of spaced apart generally parallel track members terminating in the vicinity of said spur, a diverter associated with each of said track members for selectively diverting one of said diverter shoes onto the associated one of said track members, and wherein said control means selectively operates each said diverter to divert selected ones of said shoes onto said track members.

29. The conveying system in claim 28 wherein said track members are spaced apart by substantially the length of said diverter shoes in the direction of movement of said conveying surface.

30. The conveying system in claim 6 wherein said control means includes means for determining whether one of said shoes covers an article in the direction of movement of said conveying surface.

31. The conveying system in claim 6 wherein said control means further includes means for sensing movement of said conveying surface.

32. The conveying system in claim 6 wherein said track means includes a plurality of generally parallel track members terminating in the vicinity of one of said spurs and wherein said diverting means includes a plurality of diverters, one of said diverters associated with each of said track members for selectively diverting one of said diverter shoes onto the associated one of said track members.

* * * * *